United States Patent [19]
Lehmusto et al.

[11] Patent Number: 5,907,794
[45] Date of Patent: *May 25, 1999

[54] CONTROLLING A SUBSCRIBER STATION ON A DIRECT MODE CHANNEL

[75] Inventors: Mika Lehmusto, Kerava; Mika Heiskari, Liminka, both of Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/545,726

[22] PCT Filed: Feb. 28, 1995

[86] PCT No.: PCT/FI95/00114

§ 371 Date: Nov. 2, 1995

§ 102(e) Date: Nov. 2, 1995

[87] PCT Pub. No.: WO95/24655

PCT Pub. Date: Sep. 14, 1995

[30] Foreign Application Priority Data

Mar. 3, 1994 [FI] Finland .................... 941027

[51] Int. Cl.⁶ .................... H04B 7/15
[52] U.S. Cl. .................... 455/11.1; 455/509; 455/515
[58] Field of Search .................... 455/11.1, 54.2, 455/54.1, 58.1, 33.1, 34.1, 15, 17, 9, 67.1, 56.1, 517, 518, 509, 515, 524, 8, 16, 514; 379/58, 59, 60, 63

[56] References Cited

U.S. PATENT DOCUMENTS

| | | | |
|---|---|---|---|
| 3,745,462 | 7/1973 | Trimble | 455/11.1 |
| 3,984,807 | 10/1976 | Haemming | 455/11.1 |
| 4,217,588 | 8/1980 | Freeny, Jr. | 455/11.1 |
| 4,539,706 | 9/1985 | Mears et al. | 455/11.1 |
| 4,682,367 | 7/1987 | Childress et al. | 455/17 |
| 4,833,701 | 5/1989 | Comroe et al. | 379/60 |
| 5,003,619 | 3/1991 | Morris et al. | 455/69 |
| 5,023,930 | 6/1991 | Leslie | 455/11.1 |
| 5,109,526 | 4/1992 | Reed | 455/15 |
| 5,133,080 | 7/1992 | Borras . | |
| 5,175,866 | 12/1992 | Childress et al. | 455/34.1 |
| 5,408,679 | 4/1995 | Masuda | 455/54.1 |
| 5,459,761 | 10/1995 | Monica et al. | 455/16 |
| 5,526,376 | 6/1996 | Kellenberger et al. | 455/16 |
| 5,666,661 | 9/1997 | Grube et al. | 455/509 |
| 5,771,463 | 6/1998 | Lehmusto et al. | 455/524 |
| 5,781,860 | 7/1998 | Lopponen et al. | 455/426 |
| 5,790,938 | 8/1998 | Talarmo | 455/11.1 |
| 5,802,457 | 9/1998 | Heiskari et al. | 455/88 |

FOREIGN PATENT DOCUMENTS

| | | |
|---|---|---|
| 0 433 255 A2 | 6/1991 | European Pat. Off. . |
| 2 245 125 | 12/1991 | United Kingdom . |
| 2 245 126 | 12/1991 | United Kingdom . |
| 89/07380 | 8/1989 | WIPO . |

OTHER PUBLICATIONS

Dodrill et al., "Using Radio Links and Relays", Communication Engineering, 1953 IRE national meeting of the Professional Group on Vehicular Communication, pp. 15–17, Jan. 1954.

*Primary Examiner*—Andrew I. Faile
*Assistant Examiner*—Aung S. Moe
*Attorney, Agent, or Firm*—Pillsbury Madison & Sutro LLP

[57] ABSTRACT

The present invention relates to a method and radio system for controlling a subscriber station (MS1) operating on a direct mode channel in a radio system, said radio system comprising a radio network (SwMi) with at least one base station (BS) and subscriber stations (MS1), and further, at least one repeater station (RS), which forwards traffic between said at least one base station (BS) and the subscriber stations (MS1) operating on the direct mode channel. To control the subscriber stations operating on the direct mode channel, information on the identifiers of subscriber stations operating on the direct mode channel in the coverage area of the repeater station (RS) is maintained in said repeater station (RS).

21 Claims, 3 Drawing Sheets

CONTROLLING A SUBSCRIBER STATION ON A DIRECT MODE CHANNEL

This application claims benefit of international application PCT/FI95/00114, filed Feb. 28, 1995.

FIELD OF THE INVENTION

The present invention relates to a method for controlling a subscriber station operating on a direct mode channel in a radio system, this radio system comprising a radio network with at least one base station and subscriber stations, and further, at least one repeater station, which forwards traffic between the at least one base station and the subscriber stations operating on the direct mode channel.

BACKGROUND OF THE INVENTION

The invention relates to the field of mobile phone systems. A subscriber in a mobile phone system, i.e. a subscriber station, for instance a mobile phone or some other means of communication, may be registered in a radio network or system, whereby it is registered in the radio network via system and traffic channels maintained by the base stations of the radio network.

In addition to the system channels in mobile phone systems, so-called direct mode channels can also be used in connection with a radio system, i.e. direct mode operation is applied. Subscriber stations using direct mode operation do not communicate directly with the radio network or its base stations. Direct mode channels are frequencies at which mobile phones or other means of communication are able to communicate directly with each other without the system.

Direct mode channels are typically used in situations where for instance, a group of portable mobile phones are communicating with each other at such a long distance from the base station that system channels cannot be used.

Another important way of using direct mode channels is to increase the capacity when the traffic in the system increases fast in some part of the service area of the system, for instance in some point-like part of the radio network.

A direct mode channel is referred to with the terms direct or simplex channel, or a simplex connection. A direct mode channel is a channel which is typically not at all used by the system. It may be for instance, a channel of the breadth of the channels of the system, for instance 12.5 kHz or 25 kHz. Among the mobile phones operating on a direct mode channel, the transmitting station has tuned its transmitter to the channel and transmits speech or data information. The other mobile phones set to direct mode operation have tuned their receivers to the same channel, whereby they are able to directly hear the transmission.

Operation on a direct mode channel may take place on the analog or digital modulation principle. A mobile phone transmitting on the channel may also transmit signalling information, such as information on rights of use and priorities or on the group operating on the channel. On the direct mode channel, an encryption may be carried out or plain speech can be transmitted.

Subscriber stations using direct mode operation communicate with other subscriber stations on a direct mode channel without necessarily being in direct contact with the base stations of the radio network.

One form of a direct mode channel is a direct mode channel equipped with a repeater, which direct mode channel comprises a separate repeater station in addition to the subscriber stations, this repeater station forwarding traffic between the subscriber stations using the direct mode channel. In this case, the traffic on the direct mode channel takes place on the semiduplex principle. The subscriber stations using direct mode operation can thus also communicate with the radio network via repeater stations. A repeater station is a piece of equipment comprising two radio apparatuses connected to each other. The repeater station transmits the information messages transmitted on the direct mode channel to desired network elements, for instance to the base stations of the radio network, these base stations transmitting the information messages further to the switching centres of the radio network and further to the databases located in the radio network.

In solutions according to prior art, a problem is presented, for instance by the fact that when a subscriber station, for instance a mobile phone or some other means of communication, starts to operate on a direct mode channel, the radio network or system which the subscriber has been registered in does not receive information on how information messages could be transmitted to the subscriber. The subscriber station that has switched to direct mode operation, i.e. to operate on a direct mode channel, cannot thus be reached by the radio network.

Another problem with the use of the solutions according to prior art is that when a subscriber station starts to operate on a direct mode channel, the radio network or mobile communication system loses its ability to control the operation of the subscriber station, i.e. the radio network is not able to command a subscriber station which has switched to the direct mode channel, to operate the way the radio network wants.

Yet another problem with the presented solutions according to prior art, is that when a subscriber station has switched to communicate on a direct mode channel, and the radio network is not aware of the location of the subscriber station, the radio network may page the subscriber to no avail on the system channels of its own service area, even though the subscriber station has moved outside the system. The base stations, radio paths, telecommunication resources and switching centres of the radio network are thus needlessly loaded when performing unnecessary subscriber paging.

Furthermore, yet another problem with the solutions of prior art is that they do not offer possibilities for identifying mobile phones operating on a direct mode channel. It is thus possible that such subscriber stations that do not have the radio system's permission to operate on a certain direct mode channel, nevertheless operate on this direct mode channel. These unauthorized subscriber stations may cause a great security risk especially in PMR systems (PMR= Private Mobile Radio).

SUMMARY OF THE INVENTION

The object of the present invention is to solve the above-mentioned problems associated with the solutions according to prior art.

Furthermore, the object of the present invention is to make it possible to control a subscriber station which has switched to direct mode operation and to reach it from the radio network in the coverage area of which or in the immediate vicinity thereof the subscriber station operates on the direct mode channel.

This new type of method for controlling a subscriber station operating on a direct mode channel in a radio system is achieved with the method of the invention, characterized in that information as to the identifiers of subscriber stations operating in the coverage area of a repeater station is maintained in the repeater station.

The invention further relates to a radio system comprising a radio network with at least one base station and subscriber stations and at least one repeater station, which forwards traffic between at least one base station and subscriber stations operating on a direct mode channel. The radio system of the invention is characterized in that the repeater station comprises a database containing identifiers of the subscriber stations operating on direct mode channels within the coverage area of the repeater station, and means for maintaining the identifiers of those subscriber stations in that database.

The present invention further relates to a subscriber station operating on a direct mode channel of a radio system, this radio system comprising a radio network with at least one base station and subscriber stations and at least one repeater station, which forwards traffic between at least one base station and subscriber stations operating on the direct mode channel, the subscriber station comprising a transceiver unit, a control unit and a user interface. The subscriber station of the invention further comprises means responsive to the identifier confirmation messages transmitted by the repeater station of the radio system for transmitting the identifier of the subscriber station to the repeater station.

The invention is based on the idea that a database is maintained at a repeater station of the radio system, the identifiers of those subscriber stations, i.e. mobile stations, which operate on direct mode channels within the coverage area of the repeater station being stored in this database. In order to enable connection establishment from the radio network to these subscriber stations, the identifiers of the direct mode channels on which said subscriber stations operate are also stored. This information on subscriber stations and direct mode channels is collected either passively, by listening to the operation of subscriber stations on direct mode channels, or by transmitting identifier confirmation messages to subscriber stations on direct mode channels. The collected data is transmitted, if needed, to the network element that has requested it, for instance to the subscriber database of the radio network or to a terminal equipment connected to the radio network, such as a control point (command and control point; dispatcher).

An advantage of this type of method for controlling a subscriber station operating on a direct mode channel, radio system and subscriber station, is that by operating according to the invention, the system obtains data on the location of the radio phones operating on direct mode channels in the network from a repeater station, which has collected the necessary data in its database. This information can be utilized if the system or its subscriber desires to forward information or initiate a function relating to a radio phone operating on a direct mode channel. In addition, by using this information the system may conclude that it is not worth forwarding calls and other system services to a radio phone on system calling channels.

Another advantage of the invention, is that any network element of the radio system, such as the subscriber database, dispatcher or similar, obtains information concerning which radio phones are operating on which direct mode channel. This function thus also enables the localization of illegal or unauthorized radio phones operating on the same direct mode channel within the area. After the localization, the necessary measures can be taken for eliminating the illegal subscriber stations.

BRIEF DESCRIPTION OF THE DRAWINGS

In the following, the invention will be described in more detail with reference to the accompanying drawings, in which.

DETAILED DESCRIPTION OF THE A PREFERRED EMBODIMENT OF THE INVENTION

The system of the function of the invention is mainly controlled by the repeater station. The purpose of the invention is to collect data on direct mode channel users to the repeater station and transmit it via a radio path to the system to be utilized further. This data can be used within the system as a part of radio phone location files or it can be transmitted to a desired user, such as a dispatcher.

Figure 1:
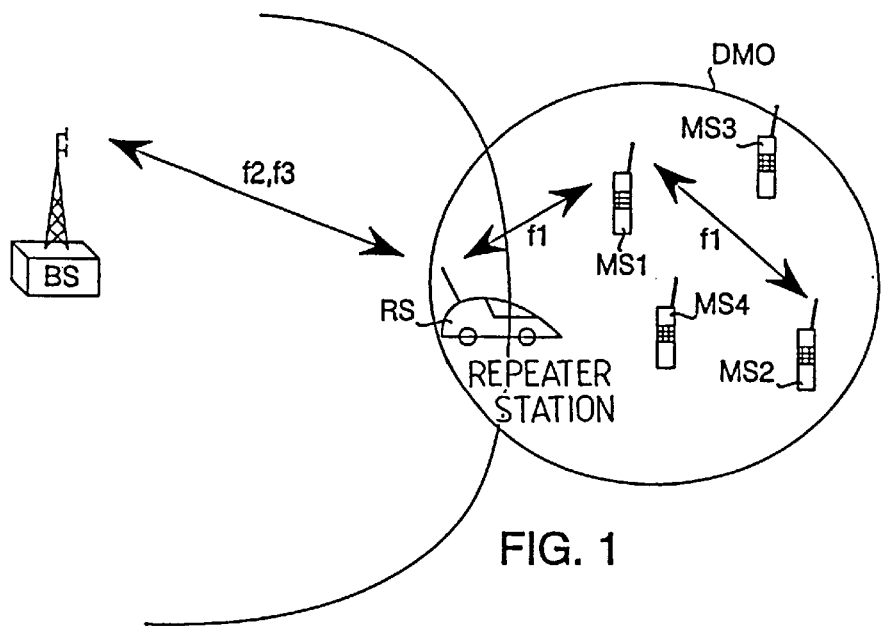
FIG. 1 shows the operation of the radio system according to the invention.

FIG. 1 shows the operation of the radio system of the invention. The invention is related to radio systems which comprise a radio network with switching centers, base stations BS, radio phones MS1–MS4 and repeater radio phones RS, and which radio systems have a cellular structure. In the system, system channels are typically used for forwarding traffic, these system channels being indicated by symbols f2 and f3 in FIG. 1, which are typically frequency pairs. They can also be channels consisting of frequencies and time slots. Direct mode operation (DMO) is usually simplex traffic taking place at one frequency, at the frequency f1 in this case. Each subscriber station, such as a mobile station, thus sends out a transmission in turn, on a direct mode channel, and while one subscriber station is sending out a transmission, the other subscriber stations are listening.

In FIG. 1, the repeater radio or repeater station RS (Repeater) enables a connection between the radio system and the direct mode operation DMO taking place unaffected by the system. The function of the system of the invention can also be used within the coverage area of the base station if the repeater radio, i.e. the repeater station RS, operates between the system and the direct mode channel.

The function of the system of the invention is mainly controlled by the repeater station RS. In the method of the present invention, the repeater station RS collects data on direct channel users and transmits it via a radio path to the system to be utilized further. This data can include for instance, the identifiers of the subscriber stations operating on the direct mode channel or the identifiers of the direct mode channels on which these subscriber stations operate. Naturally, also other data can be collected at repeater stations. The data collected at the repeater stations can be used within the system as a part of the location files of the radio phone system, or it can be transmitted to a desired subscriber, such as the dispatcher of some subscriber group or fleet.

Figure 2:
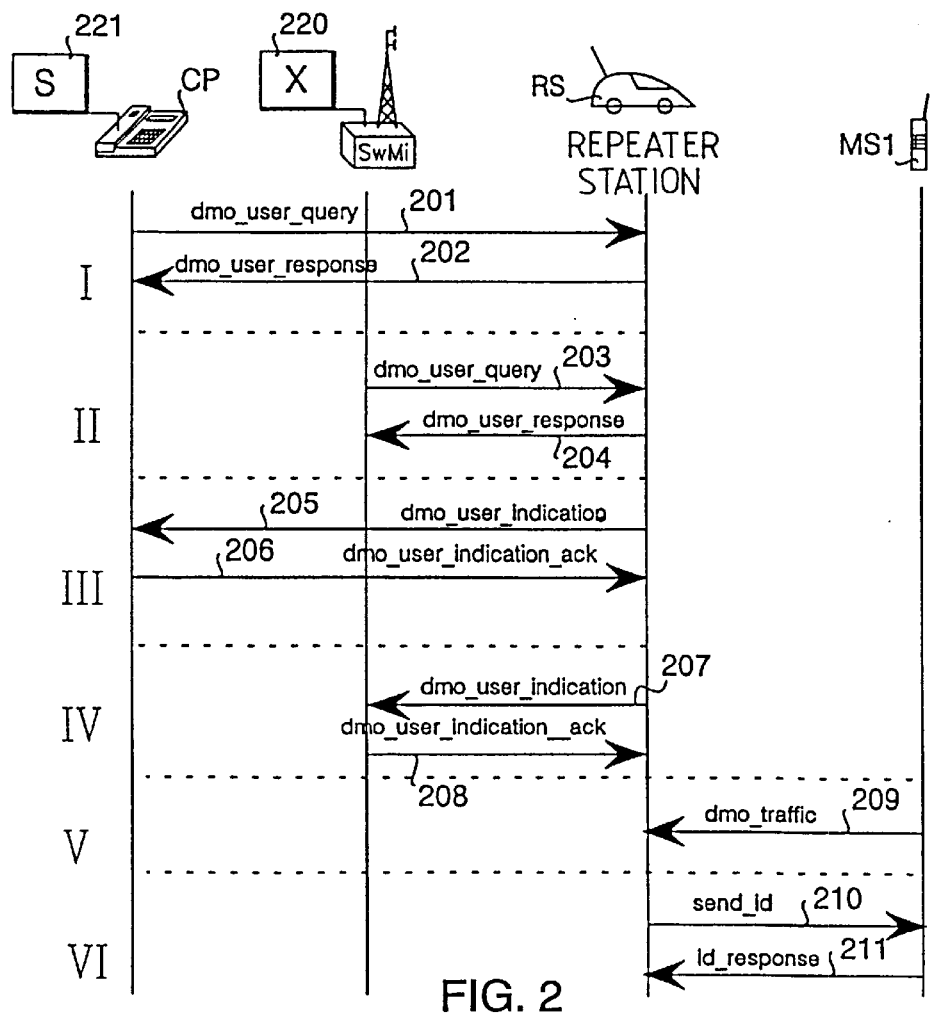
FIG. 2 shows a message diagram of the signalling required by the invention.

FIG. 2 shows a message flow diagram of the signalling required by the invention. In the figure, the different stages I–VI are separated by broken lines. In FIG. 2, the stages I–II represent the starting of the function of the invention in the repeater station by different network elements. The stages III–IV represent the transmission of the collected data to different network elements when the function has been started in the repeater radio. The stages V–VI represent the actual data collection process when the function of the invention has been started.

At stage I, the terminal equipment CP connected to the radio system, such as a telephone, control point or dispatcher, starts the data collection function of the invention by transmitting a data maintenance starting message 201, i.e. a dmo_user_query message, to the repeater station via the system. The control point connected to the radio network of the invention, such as a dispatcher or a fixed control point, comprises means 221 for starting the maintenance of the identifiers of the subscriber stations MS1–MS4 operating on direct mode channels in the repeater station RS by transmitting a data maintenance starting message 201. When the data on the radio phones operating or which are present on the direct mode channel has been collected (in the manner shown by stages V and VI in this figure), the repeater station RS transmits the data to a desired network element by a dmo_user_response message 202. The network element receiving the data may be the network element which has requested the repeater station to start data collection, or some other network element. The network element which has received the data stores the data it has received from the repeater station RS in its database.

Stage II shows a function similar to the one shown at stage I, except that now, the starter is the radio system SwMi's own application, which needs data on the radio phones using direct mode operation. An entity of the radio network thus transmits a data maintenance starting message 203, i.e. a dmo_user_query message, corresponding to the message 201. This application, i.e. the entity of the radio network SwMi, has its own address, as do the other parties participating in the signalling. The application may typically be a subscriber location database. The radio network of the invention comprises means 220 for starting the maintenance of the identifiers of the subscriber stations MS1–MS4 operating on direct mode channels in the repeater station RS by transmitting a data maintenance starting message 203. This means 220, X may be located in the switching center of the radio network or its base station BS. When the repeater station RS has collected the desired data, it transmits the collected data to a desired network element by a dmo_user_response message 204. The network element receiving the data may be the network element which has requested the repeater station to start data collection, or some other network element.

At stage III, the function of the invention is started in the actual repeater station RS, after which the data is collected from the direct mode channel, which is indicated by reference DMO and channel/frequency f1 in FIG. 1. The starting of the data collection function can take place automatically at desired intervals, or on the basis of some other criterion, or randomly. When the repeater station has collected the desired data, the repeater station RS transmits it to a desired address by a dmo_user_indication message 205, and the receiver acknowledges receipt of the data by using a dmo_user_indication_ack message 206. The data can be transmitted for instance, to the control point with a dispatcher that has started the data collection process.

At stage IV of FIG. 2, the data collection function is started in the actual repeater radio RS, and the data collection function is generally the same as at stage III. The difference is that the data is transmitted to the system application as shown at stage II. This function typically can also be carried out in connection with another function, as for instance in connection with the cases of stages I and III, or as produced by some other impulse. Thus, for instance, when the repeater station RS has collected the desired data, the repeater station RS transmits it to a desired address by a dmo_user_indication message 207, and the receiver acknowledges receipt of the data by using a dmo_user_indication_ack message 208.

Stage V of FIG. 2 shows a passive data collection method. In this method, the repeater radio RS listens to the traffic 209 of the subscriber stations MS1–MS4 (FIG. 1) on the direct mode channel DMO, f1 (FIG. 1) and collects subscriber identifier data or other desired information from the transmissions. If the traffic is listened to only for a short time, it may occur that part of the mobile stations operating on the direct mode channel have not transmitted anything, wherefore information on these subscriber stations is not obtained. On the other hand, this mechanism is preferable if it is desirable that nobody should have the slightest possibility to detect the observation of the subscriber stations operating on the direct mode channel, i.e. the collection of their identifiers. When some radio sends out transmissions on the direct mode channel, its identifier data is collected in a table in the repeater radio if it is not there already. The contents of the table are transmitted to their destination in dmo_user_response or dmo_user_indication messages, as shown at stages I, II, III and IV above.

Stage VI of FIG. 2 shows an active data collection method. In this method, the repeater radio RS transmits an identifier confirmation message 210 on desired direct mode channel or channels by using a global title, this message being described as a send_id message, in this context. All the radio phones, mobile stations, located on a direct mode channel thus transmit their direct mode channel subscriber number responsive to this message to the repeater station, which number can be the same as or different than the number in connection with the system. The transmission can take place in an id_response message 211. The identifier data is collected in a table. The contents of the table are transmitted to their destination in the dmo_user_response messages 202, 204 or in the dmo_user_indication messages 205, 207.

Making a choice between the data collection methods, i.e. whether to use the passive (stage V) or active (stage VI) one, is carried out by a parameter in the dmo_user_query message 201, 203. When the function is started in the repeater radio, the selection of the data collection method can be done by means of the pushbutton dialing of the repeater radio.

Figure 3:
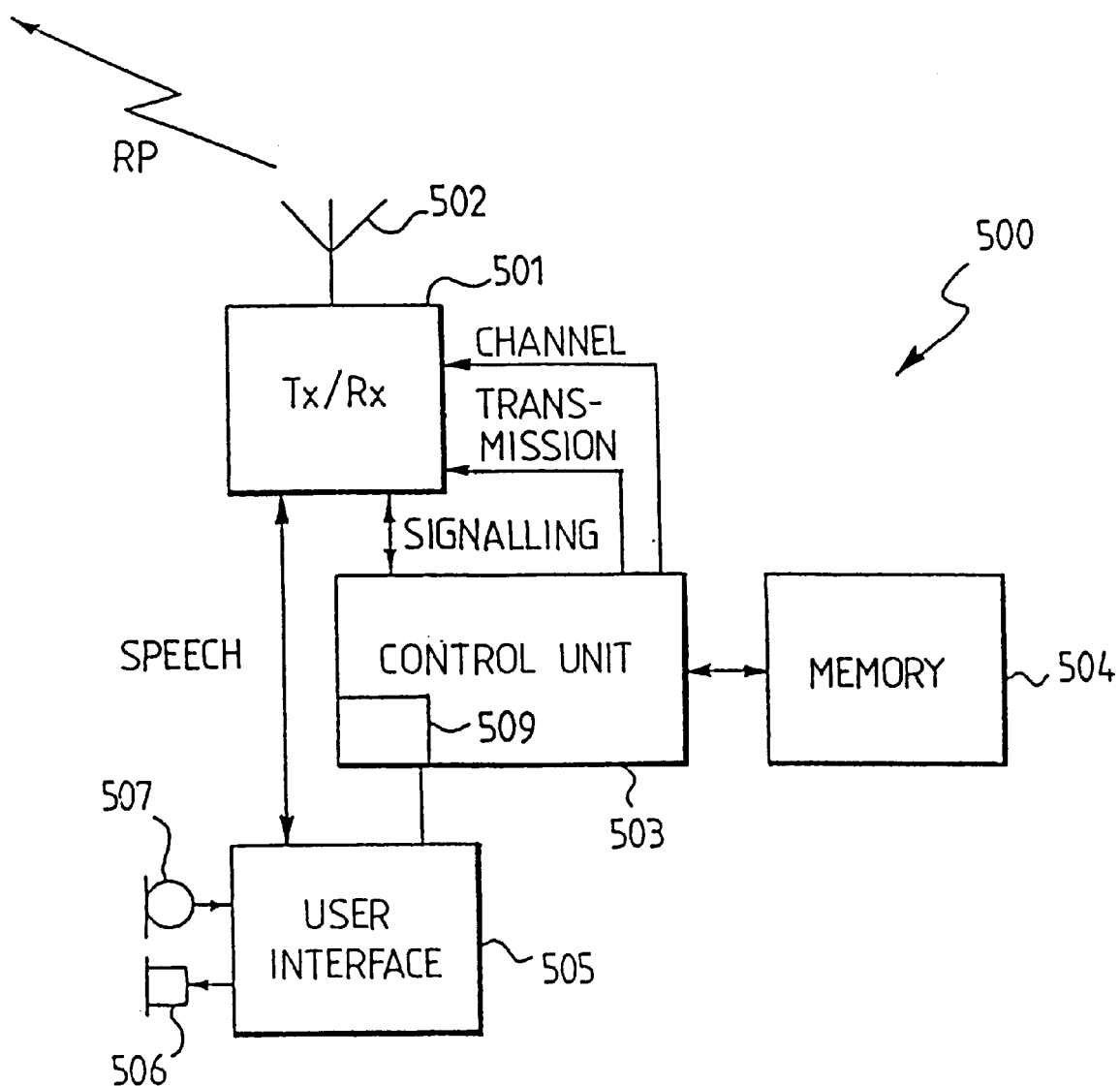
FIG. 3 shows a block diagram of the subscriber station of the radio system of the invention.

FIG. 3 shows a typical subscriber station 500 operating on a direct mode channel, i.e. a radio phone used by a subscriber. The purpose of a transceiver (TX/RX) 501 is to tune to the radio channel used in each particular case. An antenna 502 is connected with the transceiver 501, this antenna being connected with the radio path RP. Radio frequencies in the range of 60 to 1000 MHz (VHF and UHF ranges) are usually used, even though other frequencies can also be used. On the radio path RP, analogue modulation can be used, the modulation being then usually phase modulation. Other kinds of modulation can also be used. Signalling can be transmitted e.g. by a voice-frequency subcarrier (FFSK). Transmission on a radio path can also be digital.

A user interface 505 comprises electroacoustic transducing means, typically a headphone 506 and a microphone 507, and, optionally, buttons for starting and ending a call, and for dialling. Since in a trunking system and especially on a direct mode channel transmission on a radio path RP is advantageously unidirectional, the user interface usually also has a push-to-talk button that must be depressed when transmitting. The push-to-talk button is not shown in FIG. 3.

The task of a control unit 503 is to control the operation of the subscriber station. The control unit 503 is connected with the user interface 505, from which it receives impulses e.g. for starting and ending a call. The control unit 503 may also give the user, via the user interface 505, voice or visual signals that relate to the operation of the radio phone and/or the radio telephone system.

The control unit 503 is connected with the transceiver TX/RX 501. The channel employed by the transceiver is determined by the control unit 503, i.e. the transceiver 501 tunes to the channel determined by the control unit 503, i.e. to a radio frequency and a suitable time slot. The subscriber station of the invention is able to tune to a direct mode channel. The transceiver 501 is also switched on by the control unit 503. The control unit 503 receives and transmits signalling messages via the transceiver 501. The subscriber station 500, MS1 (FIGS. 1 and 2) of the invention operating on a direct mode channel is intended to be used in a radio system comprising a radio network with at least one base station and subscriber stations and at least one repeater station, which forwards traffic between at least one base station and subscriber stations operating on the direct mode channel. This subscriber station thus comprises the transceiver unit 501, the control unit 503 and the user interface 505. The subscriber station may also comprise a memory means 504.

The subscriber station 500, MS1 of the invention further comprises means 509 responsive to the identifier confirmation messages transmitted by the repeater station of the radio system for transmitting the identifier of the respective subscriber station to the respective repeater station RS (FIGS. 1 and 2).

Figure 4:
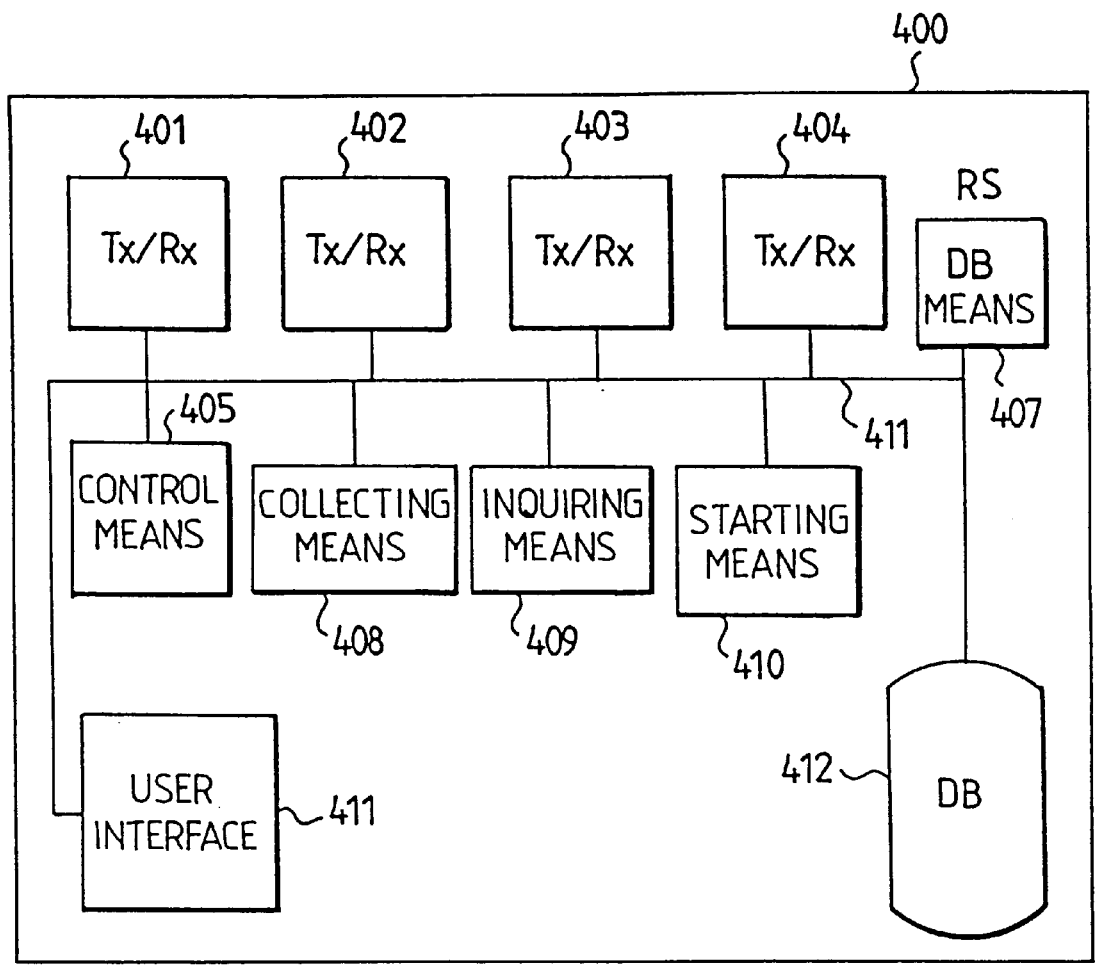
FIG. 4 shows a block diagram of the repeater station of the radio system of the invention.

FIG. 4 shows a block diagram of the repeater station of the radio system of the invention. The radio system in which the invention is intended to be applied comprises a radio network with at least one base station (FIG. 1, BS) and subscriber stations and at least one repeater station RS, 400, which forwards traffic between at least one base station and subscriber stations operating on a direct mode channel. These network elements are shown in FIGS. 1 and 2, and FIG. 3 shows the subscriber station of the invention in more detail. The repeater station comprises one or more transceiver units TX/RX, 401–404, by means of which the repeater station communicates both with the radio network and the subscriber stations operating on direct mode channels. The operation of the repeater station is controlled by a control means 405, and the user of the repeater station may control the operation of the repeater station via a user interface 411, if necessary. Within the repeater station, between its different units and the control unit and the user interface, data is transmitted by a data transmission means 411, such as a data transmission bus. The repeater station RS, 400 of the radio system of the invention comprises a database 412, DB containing the identifiers of the subscriber stations (MS1–MS4) operating on direct mode channels within the coverage area of the repeater station, and means 407 for maintaining the identifiers of said subscriber stations in said database 412, DB. It should be noticed that any other data relating to the subscriber stations operating within the coverage area of the repeater station, to the users of these stations or to direct mode channels can also be maintained in the database 412, DB.

The means 407 of the repeater station of the invention for maintaining in the database the identifiers of the subscriber stations operating on direct mode channels within the coverage area of the repeater station are arranged to maintain in the database 412, DB the identifiers of those direct mode channels on which the above-mentioned subscriber stations operate.

The repeater station RS, 400 of the invention may further comprise means 408 for collecting the identifiers of the subscriber stations MS1–MS4 operating on the direct mode channels f1 from the received signals and for storing the collected identifiers of the subscriber stations in the database 412, DB maintained by the repeater station RS.

The repeater station of the invention may further comprise means 409 for asking the identifiers of the subscriber stations MS1–MS4 operating on the direct mode channel f1 of these subscriber stations operating on the direct mode channels by transmitting an identifier confirmation message 210 to the subscriber stations MS1–MS4 operating on the direct mode channel.

The repeater station RS, 400 of the invention may further comprise means 410 for starting the maintenance of the identifiers of the subscriber stations operating on the direct mode channels.

The drawings and the description relating thereto are only intended to illustrate the idea of the invention. In its details, the method of the invention for controlling a subscriber station operating on a direct mode channel, the radio system and the subscriber station may vary within the scope of the claims. Even though the invention has been described above mainly in connection with radio telephone systems, the invention can also be used in other types of mobile communication systems.

We claim:

1. A method for controlling a subscriber station operating on a direct mode channel in a radio system, the method comprising:

providing the radio system with a radio network with at least one base station, a plurality of subscriber stations having respective identifiers, and at least one mobile relay repeater station having a coverage area;

operating at least two of the subscriber stations on a at least one direct mode channel;

the at least one mobile relay repeater station forwarding traffic on separate radio paths between the at least one base station and those of the subscriber stations which are operating on the direct mode channel;

the at least one mobile relay repeater station maintaining, in the mobile relay repeater station, data as to the identifier of each the at least one direct mode channel on which respective ones of the subscriber stations operate;

the at least one mobile relay repeater station maintaining information as to the identifiers of those of the subscriber stations which are operating on the at least one direct mode channel in the coverage area of the mobile relay repeater station, the maintaining of information as to the identifiers of those of the subscriber stations including, by the mobile relay repeater station:

listening to the operating of respective ones of the subscriber stations on the at least one direct mode channel;

collecting the identifiers of the respective ones of the subscriber stations from transmissions of the subscriber stations; and storing the collected identifiers of the respective ones of the subscriber stations operating on the at least one direct mode channel in a database of the mobile relay repeater station.

2. A method according to claim 1, wherein the maintaining further includes:

the mobile relay repeater station independently starting maintaining of the data.

3. A method according to claim 1, wherein the maintaining further includes:
the radio network starting maintaining of the data in the mobile relay repeater station by transmitting a data maintenance starting message to the mobile relay repeater station.

4. A method according to claim 3, further comprising:
transmitting the data maintained in the mobile relay repeater station to the radio network.

5. A method according to claim 1, wherein the maintaining further includes:
a terminal equipment connected with the radio network starting the maintaining of the data in the repeater station by transmitting a data maintenance starting message to the mobile relay repeater station.

6. A method according to claim 3, further comprising:
transmitting the data maintained in the mobile relay repeater station to the terminal equipment connected with the radio network.

7. A method for controlling a subscriber station operating on a direct mode channel in a radio system, the method comprising:
providing the radio system with a radio network with at least one base station, a plurality of subscriber station having respective identifiers, and at least one mobile relay repeater station having a coverage area;
operating at least two of the subscriber stations on at least one direct mode channel;
the at least one mobile relay repeater station forwarding traffic on separate radio paths between the at least one base station and those of the subscriber stations which are operating on the direct mode channel;
the at least one mobile relay repeater station maintaining, in the mobile relay repeater station, data as to the identifier of each the at least one direct mode channel on which respective ones of the subscriber stations operate;
the at least one mobile relay repeater station maintaining information as to the identifiers of those of the subscriber stations which are operating on the at least one direct mode channel in the coverage area of the mobile relay repeater station, the maintaining of information as to the identifiers of those of the subscriber stations including:
the mobile relay repeater station asking for the identifiers of the respective ones of the subscriber stations which are operating on the at least one direct mode channel within the coverage area, by transmitting an identifier confirmation message;
in response to reception of the identifier confirmation message transmitted by the mobile relay repeater station, the subscriber stations transmitting their respective identifiers to the mobile relay repeater station; and
the repeater station storing data as to the identifiers in a database of the mobile relay repeater stations.

8. A method according to claim 7, wherein the maintaining further includes:
the mobile relay repeater station independently starting maintaining of the data.

9. A method according to claim 7, wherein the maintaining further includes:
the radio network starting the maintaining of the data in the mobile relay repeater station by transmitting a data maintenance starting message to the mobile relay repeater station.

10. A method according to claim 9, further comprising:
transmitting the data maintained in the mobile relay repeater station to the radio network.

11. A method according to claim 7, wherein the maintaining further includes:
a terminal equipment connected with the radio network starting the maintaining of the data in the repeater station by transmitting a data maintenance starting message to the mobile relay repeater station.

12. A method according to claim 11, further comprising:
transmitting the data maintained in the mobile relay repeater station to the terminal equipment connected with the radio network.

13. A radio system comprising:
a radio network with at least one base station;
a plurality of subscriber stations having respective identifiers;
at least one mobile relay repeater station having a respective coverage area and which mobile relay repeater forwards traffic on separate radio paths between the at least one base station and those of the subscriber stations which are operating on at least one direct mode channel, wherein each the mobile relay repeater station comprises a database containing the identifiers of those of the subscriber stations which are operating on the at least one direct mode channel within the coverage area of the respective the mobile relay repeater station;
means for maintaining the identifiers of the respective ones of the subscriber stations in the respective the database, wherein:
for each the mobile relay repeater station the means for maintaining the identifiers is arranged to maintain in the respective the database an identifier of each direct mode channel on which each subscriber station located within the coverage area of the respective the mobile relay repeater station respectively is authorized to operate,
each the mobile relay repeater station comprising:
means for collecting the identifiers of those of the subscriber stations which are operating on the at least one direct mode channel, from received signals; and
means for storing the collected identifiers of the respective ones of the subscriber stations in the respective the mobile relay database maintained by the respective the mobile relay repeater station.

14. A radio system according to claim 13, wherein each the mobile relay repeater station comprises:
means for asking the identifiers of those of the subscriber stations which are operating on the at least one direct mode channel by transmitting an identifier confirmation message to those of the subscriber stations which are operating on the at least one direct mode channel.

15. A radio system according to claim 13, wherein the mobile relay repeater station comprises:
means for starting maintaining of the identifiers of those of the subscriber stations which are operating on the at least one direct mode channel.

16. A radio system according to claim 13, where the radio network comprises:
means for starting maintaining of the identifiers of those of the subscriber stations which are operating on the at least one direct mode channel in a respective the mobile relay repeater station by transmitting a data maintenance starting message.

17. A radio system according to claim 13, further comprising a terminal equipment connected to the radio network; the terminal equipment including:
  means for starting maintaining of the identifiers of those of the subscriber stations which are operating on the at least one direct mode channel in a respective the mobile relay repeater station, by transmitting a data maintenance starting message.

18. A radio system, comprising:
  a radio network with at least one base station;
  a plurality of subscriber stations having respective identifiers;
  at least one mobile relay repeater station having a respective coverage area, which mobile relay repeater forwards traffic on separate radio paths between the at least one base station and those of the subscriber stations which are operating on at least one direct mode channel;
  each the mobile relay repeater station comprises:
    means for asking the identifiers of those of the subscriber stations which are operating on the at least one direct mode channel, by transmitting an identifier confirmation message to those of the subscriber stations which are operating on the at least one direct mode channel;
    a database containing the identifiers of those of the subscriber stations which are operating on the at least one direct mode channel within the coverage area of the respective the mobile relay repeater station;
    means for maintaining the identifiers of the respective ones of the subscriber stations in the respective the database,
  for each the mobile relay repeater station the means for maintaining the identifiers is arranged to maintain in the respective the database an identifier of each direct mode channel on which each subscriber station located within the coverage area of the respective the mobile relay repeater station respectively is authorized to operate.

19. A radio system according to claim 18, wherein each the mobile relay repeater station comprises:
  means for starting maintaining of the identifiers of those of the subscriber stations which are operating on the at least one direct mode channel.

20. A radio system according to claim 18, wherein the radio network comprises:
  means for starting maintaining of the identifiers of those of the subscriber stations which are operating on the at least one direct mode channel in a respective the mobile relay repeater station, by transmitting a data maintenance starting message.

21. A radio system according to claim 18, further comprising a terminal equipment connected to the radio network; the terminal equipment including:
  means for starting maintaining of the identifiers of those of the subscriber stations which are operating on the at least one direct mode channel in a respective the mobile relay repeater station, by transmitting a data maintenance starting message.

\* \* \* \* \*